United States Patent [19]

Leach et al.

[11] Patent Number: 4,938,827

[45] Date of Patent: Jul. 3, 1990

[54] PREPARATION OF A SILICONE RUBBER-POLYESTER COMPOSITE PRODUCTS

[75] Inventors: Jerry G. Leach, Hudson, N.H.; Edward C. Parnagian, Burlington; Gary A. Seavey, Boxford, both of Mass.

[73] Assignee: Hewlett-Packard Company, Palo Alto, Calif.

[21] Appl. No.: 119,017

[22] Filed: Nov. 10, 1987

[51] Int. Cl.[5] .............................................. B29C 65/14
[52] U.S. Cl. ............................... 156/272.6; 156/73.1; 156/273.3; 156/307.1; 264/22; 264/83; 264/236; 264/347; 425/174.4; 425/174.8 E; 427/2; 427/40; 427/41
[58] Field of Search .................. 156/272.6, 307.1, 73.1, 156/273.3; 264/22, 83, 236, 347, 23, 129; 425/174.4, 174.8 E; 427/2, 40, 41

[56] References Cited

U.S. PATENT DOCUMENTS

| | | | |
|---|---|---|---|
| 3,462,335 | 8/1969 | Hansen et al. | 264/22 |
| 3,607,354 | 9/1971 | Krogh et al. | 264/340 |
| 3,959,567 | 5/1976 | Bradley | 264/83 |
| 3,972,973 | 8/1976 | Yardley et al. | 264/340 |
| 4,499,148 | 2/1985 | Goodale et al. | 156/272.6 |
| 4,639,285 | 1/1987 | Suzuki et al. | 156/272.6 |
| 4,765,860 | 8/1988 | Ueno et al. | 156/272.6 |

FOREIGN PATENT DOCUMENTS

| | | | |
|---|---|---|---|
| 58-152026 | 9/1983 | Japan | 425/174 |
| 60-197740 | 10/1985 | Japan | 156/272.6 |
| 61-37826 | 2/1986 | Japan | 156/272.6 |
| 62-101421 | 5/1987 | Japan | 264/340 |
| 2051844A | 1/1981 | United Kingdom | 264/340 |

OTHER PUBLICATIONS

Silicon Compounds, published by Petrarch Systems, author Barry Arkles, Date of Publication: 1984.

*Primary Examiner*—Jeffery Thurlow
*Attorney, Agent, or Firm*—Frank R. Perillo

[57] ABSTRACT

Disclosed is a process for the preparation of a composite including a room temperature vulcanizing silicone rubber and a chemically resistant polyester film which may be polyethylene terephthalate. The composite has particular utility as a part of medical equipment, for example as a component in an ultrasonic transducer. The susceptibility of the composite bond so formed to chemical challenge in the user environment is reduced or eliminated.

14 Claims, No Drawings

PREPARATION OF A SILICONE RUBBER-POLYESTER COMPOSITE PRODUCTS

BACKGROUND OF THE INVENTION

The present invention relates generally to the bonding of silicone rubber films to polyester films and particularly to the bonding of silicone rubber films to polyethylene terephthalate polyester films which are exposed in use to chemical challenge.

Silicone rubber-polyethylene terephthalate polyester film bonds have been previously prepared by a bonding process known as "priming". This "priming" process was capable of developing strong adhesive bonds between room temperature vulcanizing (RTV) silicone rubber and polyethylene terephthalate (PET) film, but the resultant bonds lacked long term stability in an presence of water and alcohol. This lack of stability is thought to be due to hydrolysis of the relatively weak mechanical bond formed by and characteristic of this process.

The "priming" process involved first cleaning the polyester film using sequentially, a detergent solution, a de-ionized water rinse and a rinse with solvents. Then, a proprietary primer based upon a silicone resin suspended in an ethyl acetate solution is applied to the polyester film. Thereafter, the polyester film is dried to remove all volatile materials. Lastly, the RTV silicone resin is mixed with its catalyst and applied to the polyester film.

These silicone rubber-polyester bonded composites are formed in a variety of manufactured items, among them certain medical devices such as ultra-sound transducers. In the instance of the transducer, the silicone rubber-polyester bonds routinely come into contact with one or both of water or alcohol, and it has become necessary to find a bonding process for the preparation of a RTV silicone rubber-PET film bond which would possess reduced or eliminated susceptibility to these chemical agents. It is therefore to the solution of the aforenoted problem that the present invention is directed.

SUMMARY OF THE INVENTION

The present invention describes a new, improved process for the preparation of a silicone rubber-polyester film bond. Surprisingly and unexpectedly, the use of a water-immersion post-curing markedly enhances the cohesive bond between the polyester film and the silicone rubber. The bond thus formed is stable to chemical challenge in the user environment.

The first step of the present method is the exposure of the polyester film to plasma treatment, as by exposure to an inert gas such as argon. This plasma treatment may be preceded by one or more cleaning steps which are performed to assure that the polyester film is free from surface contaminants.

Subsequently, the surface of the polyester film to which the silicone rubber (RTV) is to be bonded, is treated by coating with a coupling agent for the polyester and the silicone rubber. Suitable coupling agents include various siloxane couplants all of which are broadly commercially available as set forth later on herein.

After the coupling agent is applied to the surface of the polyester, the polyester is rinsed as by ultrasonic cleaning to remove all but a thin layer of the coupling agent and is thereafter dried such as by air drying to drive off volatile materials. The RTV silicone resin is then mixed with its catalyst and is then applied to the surface of the polyester bearing the thin layer of the coupling agent. The resultant film is then cured by conventional techniques, and then is immersed in water in accordance with the present invention for a period of time of at least 4-12 hours to develop the cohesive bond between polyester film and the RTV silicone resin that characterizes the present invention.

The cohesion-promoting effect of the water treatment is particularly surprising in view of the opposite result that occurs when materials bonded in accordance with conventional procedure are exposed to water in service. The benefits of the water treatment are enhanced when practiced in combination with a previously performed plasma surface treatment of the polyester.

The present method is particularly well suited to the preparation of bonded materials that are to be regularly exposed to chemical challenge in use. A specific application of these materials is their incorporation into ultrasonic transducers employed in medical diagnosis and treatment equipment, as these devices are placed against the body and are resultingly continually and periodically exposed to chemical agents.

Accordingly, it is a principal object of the present invention to provide a method for bonding a silicone rubber film and a polyester film that results in the formation of a bond that is resistant to chemical challenge.

It is a further object of the present invention to provide a method as aforesaid that is simply and inexpensively practiced and that is reliable in result.

Other objects and advantages will appear from a review of the ensuing detailed description.

DETAILED DESCRIPTION OF THE INVENTION

The present invention relates to a process for the preparation of a silicone rubber-polyalkylene terephthalate (polyester) film bond. More particularly, this invention provides a process for bonding room temperature vulcanizing (RTV) silicone rubber to a chemically resistant polyethylene terephthalate (PET) polyester film in order to reduce or eliminate the susceptability of this bond to chemical challenge in the user environment, which comprises:

exposing the polyester film to a gas plasma surface treatment with an inert gas such as argon;

exposing the surface of the polyester film to a siloxane coupling agent solution;

rinsing the thus exposed polyester film to remove all but a thin layer of the coupling agent;

drying the thin layer coated-polyester film to remove all volatile materials;

mixing the RTV silicone resin with a suitable catalyst therefor;

applying the RTV silicone resin-catalyst mixture to the dried and monolayer coated-polyester film;

curing the resultant film; and immersing the thus coated film in water to develop the cohesive bond between the polyester film and the silicone rubber.

The polyester film most commonly utilized in the process of the present invention is a polyethylene terephthalate (PET) film, and typically a "Mylar" type film which is known to be chemically resistant. Preferred PET films are those known as "Mylar ® Type S", "Goldized Mylar ® Type S" and "Mylar ® Type EL" which are commercially available for example, from E. I. DuPont de Nemours & Co., Wilmington, Del. Other polyesters are contemplated however, and accordingly, polybutylene terephthalate is illustrative of a further suitable polyester material.

The room temperature vulcanizing (RTV) silicone rubber used in the present invention may be any of the commercially available compounds. Particularly suitable RTV silicone rubber compounds include the dimethyl and methylphenyl-substituted varieties, such as those sold by General Electric Silicone Products, Waterford, N.Y., as RTV 60 or 560; with DBTDL (dibutyl-tin-dilaurate); or PS 1016 sold by Petrarch Systems, Bristol, Pa.

The initial step of the instant process involves the exposure of the polyester film to a gas plasma created by an RF field. An inert gas such as argon may be used. The plasma treatment is preferably accomplished using specialized apparatus developed for such exposure, by suppliers such as Branson/IPC, Hayward, Calif. or Plasma Science, Inc., Santa Clara, Calif.

A preliminary procedure which is followed in certain instances includes the cleaning of the surface of the polyester film with a low residual detergent followed by rinsing the film surface so treated with copious amounts of D.I. water and alcohols. This procedure assures that all possible surface contaminants that may be present on the film surface from post-manufacturing handling are removed. In some instances, this procedure is believed to further enhance the quality of the bond formed with the RTV silicone rubber.

Basically, the exposure of the PET polyester film to a gas plasma involves modifying the surface characteristics of the PET polyester film polymer by ion bombardment of the surface where active species in the plasma react with or modify the surface in a way that promotes adhesion.

Although it has been known in the art to subject various other polymers and semiconductor materials to this type of treatments prior to processing, it is thought that such treatment has never been utilized on PET polyester films and RTV silicone rubber in the manner and for the purposes of the present invention. Typical treatment times are in the range of 2 to 30 minutes, but generally are from 3 to 10 minutes.

Optionally and as indicated above, the surface of the polyester may be subjected to chemical cleaning before use, (which corresponds to the "priming" treatment described earlier herein). For example, the surface of the polyester may first be cleaned by the sequential treatment with a detergent, a de-ionized water rinse and a methanol rinse. This treatment is employed for the purpose of removing possible surface contaminants before the bonding process commences, but as indicated, is not necessary to the successful practice of the invention.

After the exposure of the PET polyester film to the argon gas plasma, the film is exposed to a solution of a suitable siloxane coupling agent. Such coupling agents are well known in the art and preferred ones are of the type available as S 1590 3-(N-styrylmethyl-2-aminoethylamino)-propyltrimethoxysilane hydrochloride) and A 0750, (3-aminopropyl-triethoxysilane), from Petrarch Systems. Other suitable siloxane coupling agents which may be utilized are those of the types known as A0700, N-2-aminoethyl-3-aminopropyl trimethoxysilane; T 2910 trimethoxysilylpropyl-diethylenetriamine; PS076; and G 6720, 3-glycidoxypropyltrimethoxysilane, all also available from Petrarch Systems, a subsidiary of Dynamit Nobel Chemicals.

The solutions of the coupling agents may be prepared in various ways depending upon the environment of intended use, and the manufacturers of the respective coupling agents may be individually consulted. For example, the coupling agents manufactured by Petrarch Systems may be prepared from an acidified methanol mixture, or may be rinsed in isopropanol. The foregoing protocols are presented for purposes of illustration and not limitation.

Following the exposure of the PET polyester film to the siloxane coupling agent solution and the curing thereof, the PET film is rinsed to remove all but a thin layer of the coupling agent. This is accomplished by a variety of techniques of which ultrasonic cleaning is but an example.

The coating of the siloxane coupling agent is allowed to cure for a suitable time, generally dependent upon the particular siloxane coupling agent utilized. Usual cure times are in the range of 30 minutes to 3 hours, and preferably are about one hour.

The thin layer-coated polyester film is then dried to remove all volatile materials. This is typically accomplished by enclosing the film in a controlled-temperature oven, or allowing the film to dry in open air at room temperature. The exact parameters of the drying step will vary according to the characteristics of the materials, including the coupling agents, that are used, and information regarding suggested and optimum drying parameters will be available from the manufacturers' specifications for the materials in question.

The RTV silicone resin is then mixed with a suitable catalyst and applied to the dried- and thin layer coated-polyester film. The catalyst is chosen based upon the particular RTV silicone rubber utilized. In fact, most RTV silicone resins are supplied by their manufacturer with a particularly suitable catalyst, such as DBTDL (dibutyl-tin-dilaurate). However, it is not absolutely necessary to use that particular catalyst, and others, such as tin octoate, can be substituted, with similar results. The catalyst is added in a catalytic amount which varies with the particular RTV silicone resin and catalyst being used. Typical amounts may range from 0.01 to 1% by weight of active catalyst.

After application of the RTV silicon resin-catalyst mixture to the dried- and monolayer coated-polyester film, the resultant film is air-cured for a suitable period. This cure time is of course dependent upon the particular RTV silicone resin, its catalyst, the siloxane coupling agent and the polyester film utilized. Typical cure times range from one hour to about 6 days, with preferred times being in the range of 12 to 36 hours.

The final step of the present process involves exposure of the cured silicone rubber-polyester film to water as by immersion therein, for a period of 12 to 48 hours. Preferably, the temperature of the water is maintained between room temperature and 50° C. for this step. A particularly preferred immersion time is about 24 hours.

While not wishing to be bound by a particular theory of operation, it is believed that the immersion of the cured silicone rubber-polyester film in water in some way hydrates the interface and stimulates the bond between the RTV silicone rubber and the siloxane film. This immersion gives the resultant bond a reduced susceptibility to further challenge by water and alcohols in the user environment. It is theorized further that the process of the present invention provides a water- and alcohol-stable bond because the bond formed by the present process is of a chemical nature rather than of the mechanical nature as is produced by the prior art "priming" process. In the case of hospital machinery where such bonds are routinely washed and disinfected, such susceptibility destroys the bonds in a very short time. It is for this reason that such a process was necessary to eliminate item failures in the user environment.

A further optional step which can be added to enhance the present process is the addition of a bake cycle subsequent to the final water-immersion step. The cured and hydrated silicon rubber-PET polyester film is typically baked for 1–7 days at a temperature of 40°–60° C., preferably at about 50° C. The reason for the enhancement of the final bond by this baking step is not known and it has been found to give no further enhancement in the case of some siloxane coupling agents.

The stability of the bond can be demonstrated by accepted testing methods known in the art for measuring bond strength. A particular testing method will be described below, which was utilized in the performance of the tests presented herein.

The samples prepared for peel testing comprised a generally cylindrical "nose" prepared from a synthetic resin known as Noryl ®, one open end of which has been closed off by the bonding thereto of a circular disc of a cured RTV silicone rubber. It is to the outer surface of the silicone rubber that the polyester film is to be bonded.

The film (generally gold Mylar ®) is first cut into patches and then taped on a glass slide with its conductive surface against the slide. A coupling agent such as those described earlier is mixed in a beaker together with methanol and acetic acid in a ratio of 95 grams of methanol, 5 grams of a 5% acetic acid solution and 2 grams of coupling agent. The mixture is stirred first with a glass rod and then the beaker is covered and ultrasonically agitated for two minutes. This mixture is then allowed to sit on the solvent bench for 30 minutes.

Before the coupling agent is applied to the free surface of the Mylar film, the film is given a plasma treatment. In particular, the film is placed in a chamber having a pressure of 0.4+/−0.05 Torr (while plasma is on). Argon gas is circulated through the chamber, at a flow rate of 150 ml/minute and a subsequent dry nitrogen purge is employed. The treatment is conducted at a power of 250 watts (FWD) for a period of 5 minutes. After the treatment, the coupling agent mixture is poured into a petri dish and the plasma treated film samples are immersed therein. The dish is agitated gently by hand for about 2 minutes after which the samples are placed in a 1000 ml beaker, supported therein, covered with isopropanol and ultrasonically rinsed for 2 minutes. The samples are then removed from the beaker and cured at room temperature for 30 minutes.

To conduct the test, the Mylar film is then attached to the outer surface of the RTV portion of the "nose" assembly. After, the Mylar is given a chemical cleaning, treated with siloxane and after a 30 minutes cure, the Mylar sample is placed against a lense plate with its conductive side against the plate, after which the "nose" is placed against the Mylar. RTV is catalyzed and poured into place on the Mylar surface where it proceeds to crosslink into a solid structure.

After curing is complete, the "nose" having the Mylar film bonded to the outside surface of the RTV silicone rubber is hydrated in accordance with the present invention by the placement of D.I. water into the inside of the "nose" followed by the covering of the back of the "nose" with plastic wrap secured by a rubber band. The filled "nose" thus prepared is placed in an oven maintained at 50° C. for a period of 24 hours. After the oven treatment is complete, the "nose" is removed from the oven, the rubber band and plastic sheet are removed and the water emptied, and the part set aside to cool before testing. Two strips of 3 inch long adhesive tape are applied to the Mylar film so that it is disposed therebetween to facilitate a peel test.

The general peel test procedure utilizes a Chatillon test frame having a bottom compression plate and top cross arm spaced about 8 inches apart from each other. In the instance where the peel test is conducted between the RTV resin and the Mylar sheet, the "nose" is placed in a machinist's vise which in turn, is clamped to the center of the compression plate. The compression plate is then adjusted so that the top tensile gripper can receive the taped lead of the Mylar film or shield. Thereafter, the tensile gripper is tightened and the "nose" is ready for testing.

If the peel test is to be performed between two sheets of material, the bottom tensile gripper is mounted in the tapped hole of the compression plate, one of the taped peel monitor ends is inserted into the top tensile gripper, the gripper is tightened and the compression plate is then moved up or down until the other taped end of the monitor can be inserted into the bottom tensile gripper.

Thereafter, the bottom tensile gripper is tightened, and slack is minimized. The speed is accordingly switched to "min" corresponding to about 1.4 inches per minutes.

As the peel test will be performed in conjunction with a plotter and digital readout controls, no other controls on the tester frame need be adjusted.

The digital readout box is then adjusted to the "100 pound" range. Utilizing the zero knobs on the digital readout box, both the force and travel readout are adjusted to zero, making sure that both "max holds" are off. The plotter power/servo switch is then turned to the "on" mode, the "hold/release" switch is placed in "release", graph paper is loaded into the plotter and the "hold/release" switch is then placed in "hold". The "X range selector" is then switched to the 50 mV/in position, while the "Y range selector" is placed in the 5 mV/in position.

The zero knobs on the plotter may be used to move the pen to an appropriate starting point on the lower left corner, and it is recommended that the starting point be placed where a vertical and horizontal line cross. To set the plotter's vertical scale, the zero point is then marked with a pen, and thereafter using the coarse force zeroing knob on the digital readout, the force reading is changed to 1.0 pound. Using the vernier knob for the Y range on the plotter, the height of the pen is adjusted so that it is ten blocks away from the zero point, (Y range is now calibrated ten blocks to a pound) and then the one pound height is marked with a pen. Using the force zeroing knob on the digital readout, the force reading is returned to 0.0.

To set the plotter's horizontal scale, the travel zeroing knob is adjusted on the digital readout to 0.5 inches. Using the X vernier on the plotter, the pen is moved out to the middle of the graph paper and the 0.5 point is marked. Thereafter, using the traveling zeroing knob on the digital readout, the travel readout is returned to zero.

The peeling of the sample is started by using the down button on the frame control panel. The button is continually held down until something comes loose or gives way. If this occurs, the peel procedure should be stopped, the sample and its holder should be retightened, the digital display should read 0 and peeling should commence again. The zero control should not be reset to zero. Generally, the sample should be peeled to half of its length after which the sample may be removed from the grippers and the vise. The hold/release switch on the plotter should be switched to "release" and the graph paper removed so that the date and lot number of the particular sample being tested could be recorded on the graph paper.

If the bonding to RTV is being observed, the sheet pulled off the RTV should be inspected visually to determine how much of the surface failed cohesively and how much failed adhesively. The percentage of cohesive failure should then be recorded on the graph paper. It must be noted that cohesive failure is determined to exist when the RTV rips leaving RTV stuck to the Mylar sheet that was pulled away. Adhesive failure is evident when the adhesive fails leaving the sheet that was pulled away clean of any RTV.

As will be indicated in the example following hereafter, data is expressed in pounds per inch. Higher numbers and higher percentage of coverage reflected improved cohesive strength and results.

The following examples describe in detail the preparation of bonds utilizing the process of the present invention. It will be apparent to those skilled in the art that many modifications, both of materials and methods, may be practiced without departing from the purpose and intent of this disclosure.

EXAMPLE I

The general method of the present invention was tested by the preparation of separate groups of parts with each group containing multiple samples of material. Each group was subjected to process variations such as length of rinse time or post-preparation hydration treatment. Accordingly, Mylar ® samples were first treated by exposure to an argon plasma followed by a nitrogen gas backfill of the plasma reactor chamber. Subsequently, the coupling agent identified as S1590 was prepared in a solution containing 95% methanol and 5% acidified water comprising a 5% acetic acid solution. Two percent of the coupling agent was added to this solvent mixture.

The coupling agent solution was allowed to sit 30 minutes and then was applied to the polyester film, by immersion for two minutes in the solution. Samples were ultrasonically rinsed in isopropyl alcohol for 4, 17, and 32 minutes to remove excess coupling agent and set aside to dry for four hours in air at 50° C. Thereafter, the RTV silicone resin known as GE-60, Lot number EN549, was prepared with 0.45% catalyst and 1.2 cc liquid. Portions of the resulting catalyzed resin were then applied to the polyester surface bearing the coupling agent.

The thus coated polyester film samples were cured 20 hours after which they were hydrated in 50° C. water for periods of 8 to 100 hours. Thereafter, peel tests were conducted to determine the strength of bonds and percent of cohesive bond evident at the RTV/Mylar interface. The results are set forth below.

TABLE I

| Rinse Time (min) | HYDRATION TIME | | | | | | | | | |
|---|---|---|---|---|---|---|---|---|---|---|
| | 8 hrs | | 20 hrs | | 32 hrs | | 72 hrs | | 100 hrs | |
| | Peel #/in | Cov % | Peel #/in | Cov % | Peel #/in | Cov % | Peel #/in | Cov % | Peel #/in | Cov % |
| 4 | 0.3 | 0 | 1.89 | 64 | 1.81 | <80 | 2.02 | 95 | 1.92 | 92 |
| 17 | 0.9 | <25 | 2.10 | 85 | 2.07 | >98 | 2.12 | >98 | 2.07 | >98 |
| 32 | 0.2 | 0 | 0.5 | 0 | 1.06 | 44 | 1.94 | <90 | 1.95 | <92 |

From the above, it appears that substantial improvements in bonding were achieved when hydration was conducted for 20 hours. It therefore confirms that the extended hydration of the present invention promotes a stronger bonding between the silicone rubber and the polyester.

EXAMPLE II

In another experiment six groups having 4 parts each were prepared as follows. Each of the samples was preliminarily treated by exposure to an argon plasma and a nitrogen backfill of the plasma reactor chamber.

Thereafter, the coupling agent known as Z 6032 from Dow Corning was prepared in two mixtures of 95% methanol and 5% acetic acid solution containing 0.5% and 1.0% of the coupling agent. The coupling agent solution sat 30 minutes and was then applied to samples for 2 minutes, 5 minutes and 10 minutes, followed by ultrasonic rinsing for two minutes. The samples were then dried 1 to 2 hours at room temperature and coated with catalyzed RTV silicone rubber. The RTV was then cured 20 to 24 hours and divided into two groups that were hydrated for 24 to 48 hours, respectively.

After hydration, samples were peel tested and the force required to separate the RTV/Mylar interface was recorded as well as the percent of cohesive failure at the interface. The results are set forth in Table II, below.

TABLE II

| Application Time: | 2 minutes | | 5 minutes | | 10 minutes | |
|---|---|---|---|---|---|---|
| Concentration (Weight %) | Peel #/in | Cov % | Peel #/in | Cov % | Peel #/in | Cov % |
| Hydration Time: 24 hours | | | | | | |
| 1.0 | 0.70 | 15 | 0.20 | 0 | 0.50 | 10 |
| 0.5 | 0.60 | | 0.65 | | 0.63 | |
| Hydration Time: 48 hours | | | | | | |
| 1.0 | 1.85 | 85 | 1.64 | 75 | 1.80 | 86 |
| 0.5 | 1.58 | 70 | 1.00 | 38 | 1.92 | 80 |

As with the results of Example 1, the data presented above demonstrates that extended exposure of the bond interface to hydration promotes improved bonding and that application time also affects the rate of bond development.

This invention may be embodied in other forms or carried out in other ways without departing from the spirit or essential characteristics thereof. The present disclosure is therefore to be considered as in all respects illustrative and not restrictive, the scope of the invention being indicated by the appended claims, and all changes which come within the meaning and range of equivalency are intended to be embraced therein.

What is claimed is:

1. A process for bonding a silicone rubber to a chemically resistant polyester film in order to reduce or eliminate the susceptibility of the resulting bond to chemical challenge in the user environment, which comprises:
   exposing the polyester film to gas plasma treatment;
   exposing the gas plasma treated polyester film to a siloxane coupling agent solution;
   rinsing the plasma-treated polyester film to remove all but a thin layer of the coupling agent;
   drying the polyester film coated with the coupling agent to remove all volatile materials;
   mixing an RTV silicone resin with a suitable catalyst therefor;
   applying of the RTV silicone resin-catalyst mixture to the dried and coupling agent-coated polyester film;
   curing the resultant film; and
   immersing the cured film in water to develop the cohesive bond between the polyester film and the RTV silicone rubber.

2. The process of claim 1 wherein the polyester film is subjected to a chemical cleaning prior to the gas plasma exposure.

3. The process of claim 1 wherein the polyester film is subjected to a bake cycle after the water immersion step.

4. The process of claim 1 wherein the water immersion step is conducted with room temperature water.

5. The process of claim 1 wherein the siloxane coupling agent utilized is selected from the group consisting of 3-(N-styrylmethyl-2-aminoethylamino) propyltrimethoxy silane HCL, N-2-aminoethyl-3-aminopropyltrymethoxy silane, trimethoxysilylpropyl-diethylene triamine 3-glycidoxypropyltrimethoxysilane, and 3-aminopropyltriethyloxysilane HCL.

6. The process of claim 1 wherein the RTV silicone resin is of the dimethyl and methylphenyl-substituted varieties and the catalyst utilized is dibutyl tin-dilaurate.

7. The process of claim 1 wherein the water immersion step is conducted for at least about 4–12 hours.

8. The process of claim 1 wherein the water immersion step is conducted for at least about 24 hours.

9. The process of claim 1 wherein the rinsing of the excess siloxane coupling agent is accomplished by ultrasonic cleaning in isopropanol.

10. The process of claim 1 wherein the polyester is a polyalkylene terephthalate.

11. The process of claim 10 wherein the polyester is polyethylene terephthalate.

12. The process of claim 10 wherein the polyester is polybutylene terephthalate.

13. A process for bonding an RTV silicone resin to a chemically resistant polyester film in order to reduce or eliminate the susceptibility of the resulting bond to chemical challenge in the user environment, which comprises:
   exposing the polyester film to gas plasma treatment;
   mixing an RTV silicone resin with a suitable catalyst therefor;
   applying a siloxane coupling agent to the plasma-treated polyester film;
   applying the catalyzed RTV silicone resin to the plasma-treated polyester film; and
   allowing chemical bonds to form between the foregoing materials in the presence of sufficient water to stimulate bond formation stable to subsequent challenge by water.

14. A process for bonding an RTV silicone resin to a chemically resistant polyester film in order to reduce or eliminate the susceptibility of the resulting bond to chemical challenge in the user environment, which comprises:
   exposing the polyester film to gas plasma treatment; and
   securely attaching a catalyzed silicone resin to the plasma-treated polyester film via a siloxane coupling agent by applying the catalyzed RTV silicone resin and the siloxane coupling agent to the plasma-treated polyester film and allowing bonds to form between the catalyzed RTV silicone resin and the siloxane coupling agent in the presence of sufficient water to substantially hydrate the interface between the catalyzed RTV silicone resin and the siloxane coupling agent and to stimulate a bond stable to subsequent challenge by water.

* * * * *

UNITED STATES PATENT AND TRADEMARK OFFICE
CERTIFICATE OF CORRECTION

PATENT NO. : 4,938,827

DATED : 7/3/90

INVENTOR(S) : Jerry G. Leach, Edward c. Parnagian, and Gary A. Seavey

It is certified that error appears in the above-identified patent and that said Letters Patent is hereby corrected as shown below:

Column 4, line 10, "or" should read — and —

Signed and Sealed this

Nineteenth Day of May, 1992

Attest:

DOUGLAS B. COMER

Attesting Officer

Acting Commissioner of Patents and Trademarks